Dec. 1, 1959  W. H. LANNERT  2,915,184
COMMINUTING DEVICE
Filed June 25, 1956  3 Sheets-Sheet 1

Inventor
William H. Lannert
By Schneider & Dressler, Attys

Dec. 1, 1959  W. H. LANNERT  2,915,184
COMMINUTING DEVICE
Filed June 25, 1956  3 Sheets-Sheet 2
Fig. 3
Fig. 2
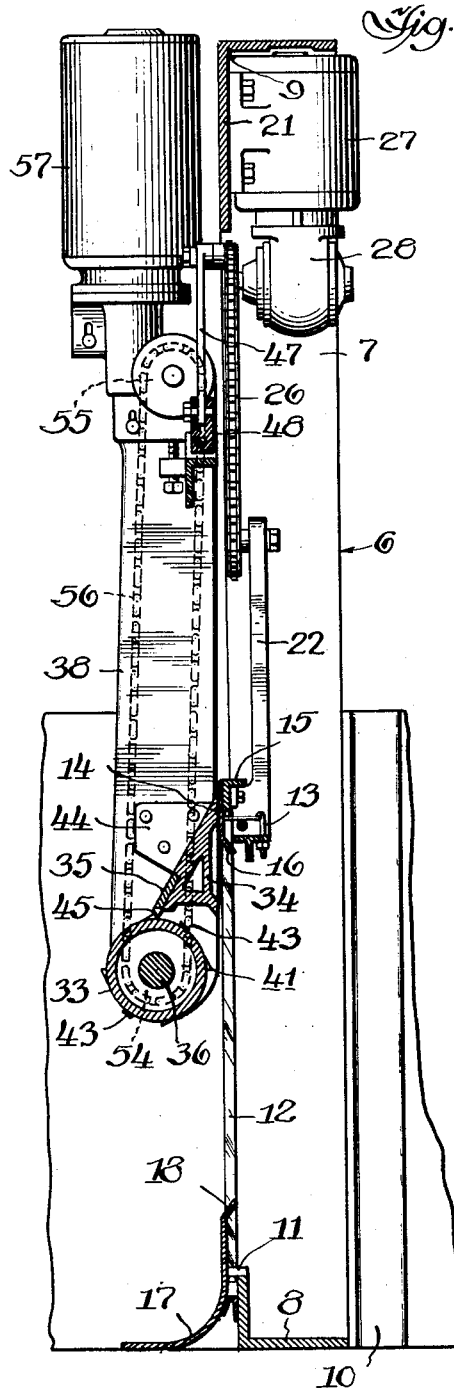
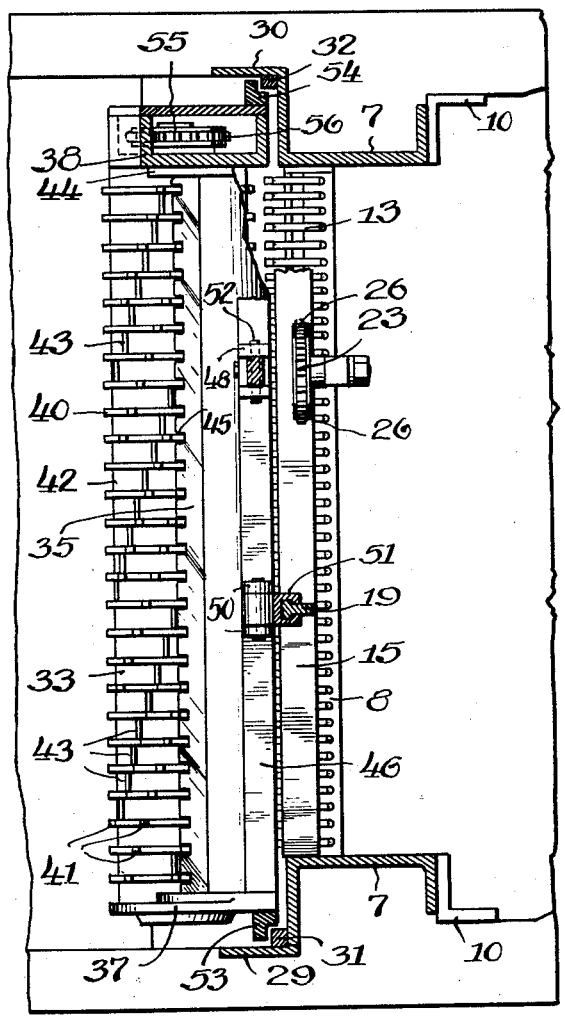
Inventor,
William H. Lannert,
By: Schneider & Dressler, Attys.

Dec. 1, 1959   W. H. LANNERT   2,915,184
COMMINUTING DEVICE
Filed June 25, 1956   3 Sheets-Sheet 3
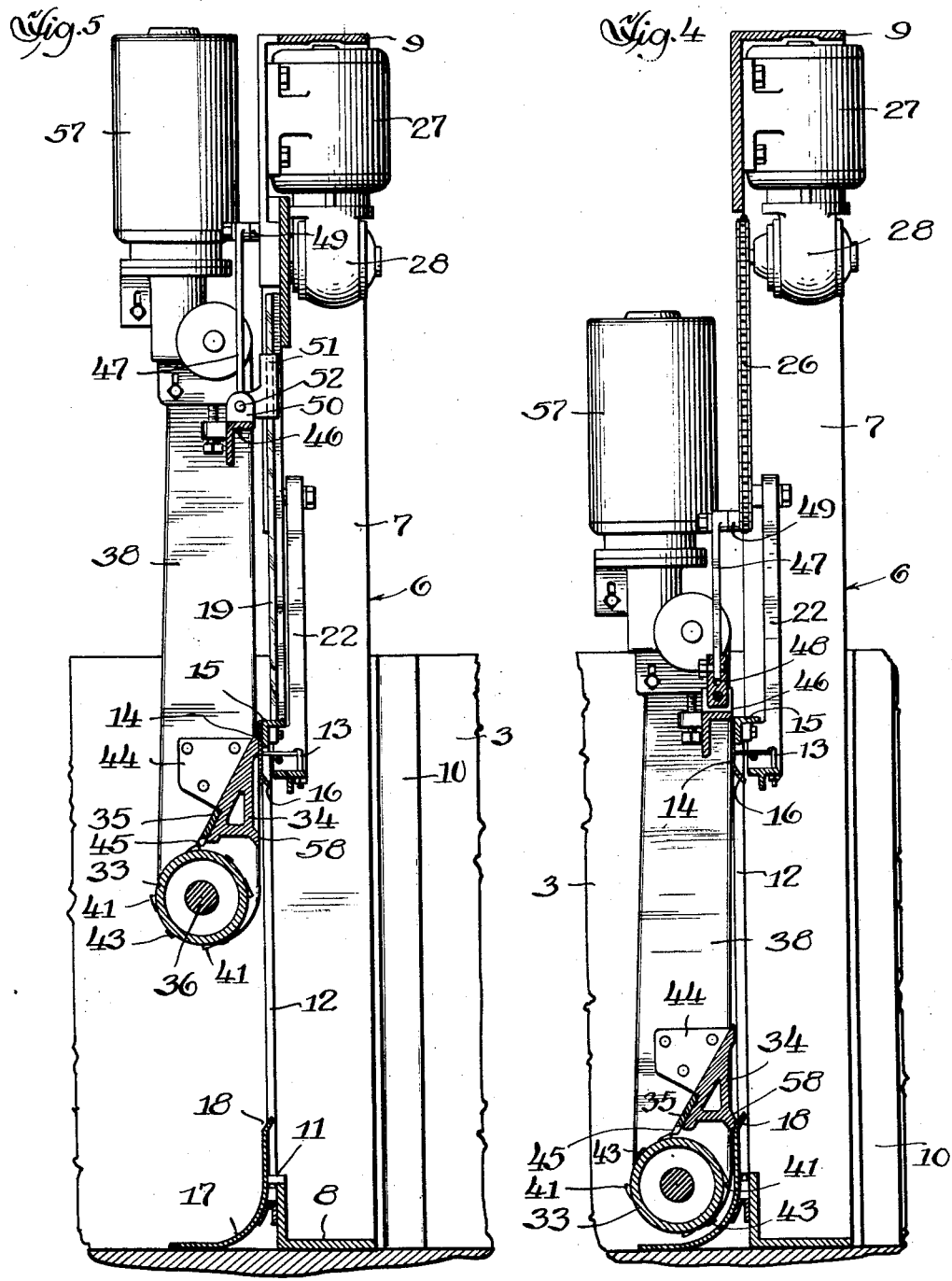
Inventor,
William H. Lannert
By: Schneider & Dressler,
Attys.

United States Patent Office 2,915,184
Patented Dec. 1, 1959

2,915,184

COMMINUTING DEVICE

William H. Lannert, Skokie, Ill., assignor, by mesne assignments, to Food Machinery and Chemical Corporation, San Jose, Calif., a corporation of Delaware Application June 25, 1956, Serial No. 593,640

7 Claims. (Cl. 210—173)

This invention relates to a comminuting device, and is particularly concerned with means for reciprocating a cutting cylinder and comb in front of a screen fixed in a sewage channel.

In accordance with the present invention a screen is disposed in vertical position in the channel through which the sewage flows. The screen preferably comprises a plurality of vertically disposed flexible ribbons that are held in taut condition by suitable tensioning means. A horizontally disposed cutting cylinder and a rake are mounted in a supporting frame adapted to be moved vertically relative to the screen. A comb is mounted on the rake in position to cooperate with the cutting cylinder to comminute the solids intercepted by the screen and wiped therefrom by the rake. A motor for rotating the cutting cylinder is mounted on the top of the supporting frame. Although a submersible type of motor is used, it is positioned above the screen to avoid interference with the flow capacity of the screen.

The supporting frame, which carries the cutting cylinder, rake and comb, is reciprocated vertically by means of a link and an endless chain driven by a second motor which is mounted on a stationary frame. The weight of the supporting frame holds it against the downstream face of the screen. The rake is mounted above the cutting cylinder, and the comb is mounted on the rake in position to cooperate with the cutting cylinder to comminute the solids in the sewage stream.

Some of the solids flowing in the sewage stream are intercepted by the surface of the cutting cylinder and are carried thereby directly to the comb so that they are comminuted immediately. The rest of the solids are intercepted by the screen, either above or below the cutting cylinder. As the cutting cylinder is moved upwardly, the rake, which is in the form of a wiper member that sweeps over the upstream surface of the screen ribbons, pushes the solids upwardly. As the rake moves upwardly some of the solids fall on to the cylinder and are comminuted, and some are held against the screen by the flow of sewage. The upper limit of travel of the rake is above the liquid level of the sewage. Accordingly, the solids held against the screen by the force of the flowing sewage are released from such force as they are pushed above the liquid level by the rake. The solids fall on to the cylinder when they are released from the force of the sewage flow, and are comminuted.

The cutting cylinder is constantly rotated in the same direction, and when the supporting frame is being moved downwardly the direction of rotation of the cutting teeth on the lower half of the cylinder is away from the screen. Accordingly, as the solids intercepted by the screen below the cutting cylinder are encountered by the cylinder or the lower end of the rake during the downward movement of the comminuting device they are forced away from the screen back into the sewage stream. This action cleans the lower portion of the screen so that the rake retains its position in juxtaposition to the upstream surface of the screen.

The cutting cylinder comprises a series of cutting disks held on a shaft in predetermined spaced relationship. Each cutting disk is aligned with a notch in the comb, and cutting teeth projecting from the periphery of each disk pass through the notches of the comb to comminute the solid matter carried through the notches by the teeth as the cutting cylinder is rotated. A plurality of shear bars secured to the periphery of the cylinder between adjacent disks cooperate with the edge of the comb between adjacent notches to break up large solids, such as rags, that may extend over a plurality of cutting disks, and thereby facilitate the comminution of such solids.

The structure by means of which the above mentioned and other advantages of the invention are attained will be described in the following specification, taken in conjunction with the accompanying drawings, showing a preferred illustrative embodiment of the invention, in which:

Fig. 2 is a cross sectional view, taken along the line 2—2 of Fig. 1;

Fig. 3 is a cross sectional view, taken along the line 3—3 of Fig. 1;

Fig. 4 is a view similar to Fig. 3, with the supporting frame in its lowermost position; and Fig. 5 is a cross sectional view, taken along the line 5—5 of Fig. 1.

Figure 1:
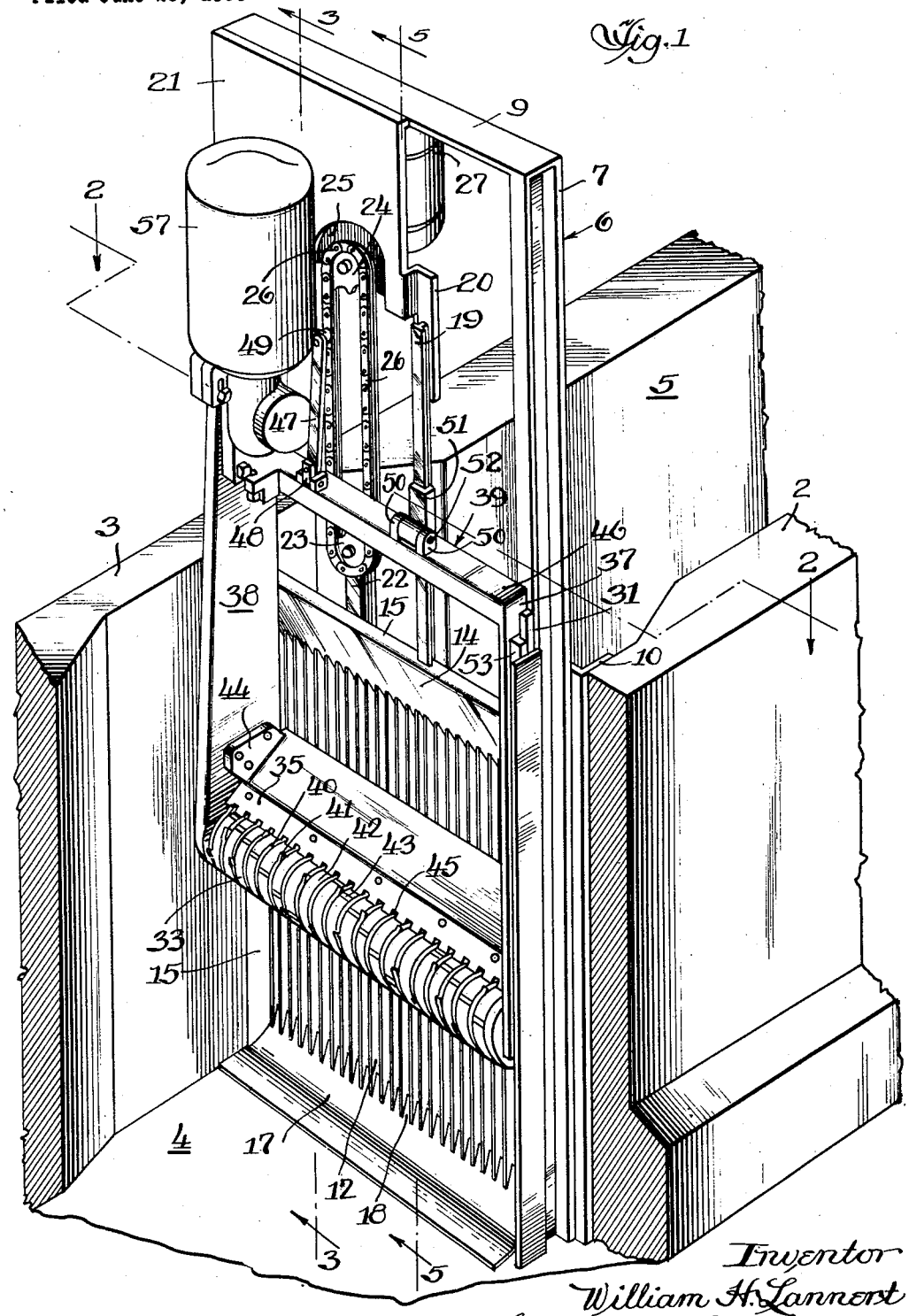
Figure 1 is a perspective view of a comminuting device embodying the invention, showing it installed in a sewage channel.

Referring to the drawings, the reference numerals 2 and 3 indicate concrete walls forming an influent channel 4 and an effluent channel 5. A rectangular metal frame 6 comprising side walls 7, a bottom wall 8, and a top wall 9 is mounted to extend across the channel between side walls 2 and 3. Bottom wall 8 is in the form of an angle iron having one side on the bottom of channel 5. A pair of angle irons 10 secured to side walls 2 and 3 on the downstream side of frame 6 supports the frame in its vertical position.

A flat bar 11 mounted on the upper edge of bottom wall 8 extends forwardly thereof and is provided with a plurality of laterally spaced parallel slots (not shown) in each of which an individual screen element 12 is positioned. The screen comprises a plurality of elements in the form of flat metal ribbons disposed edgewise in bar 11 and each having its lower end curled to prevent vertical movement through its slot. The upper end of each ribbon is held by a tension device 13. The upper ends of the screen elements are covered by a sheet metal shield 14 secured to an angle bar 15. The lower edge of shield 14 is notched to provide fingers 16 which project rearwardly into spaces between adjacent screen elements. The lower ends of the screen elements are covered by a sheet metal shield 17 curved upwardly from the bottom of channel 4 and having its upper edge notched to provide fingers 18 which project rearwardly into the spaces between adjacent screen elements.

A center guide in the form of a T-bar 19 is secured to angle bar 15 and extends upwardly therefrom. T-bar 19 has its upper end secured to a flange 20 extending from a plate 21 which is welded to the upper portion of frame 6. An angle bar 22 secured at its lower end to angle bar 15 projects upwardly and supports a sprocket 23 rotatably mounted on its upper end. A similar sprocket 24 is rotatably mounted on an offset portion 25 of plate 21 adjacent its lower edge. The offset 25 is provided so that sprockets 23 and 24 are rotatable in the same plane. An endless chain 26 extending around both sprockets is driven by a motor 27 through reduction gearing 28. Motor 27 is mounted on plate 21. If desired, an endless band and any suitable rotatable pulleys may be substituted for the chain 26 and sprockets 23 and 24.

A vertical flange 29 secured to the forward edge of side wall 7 extends forwardly from the outer edge of frame 6. A similar flange 30, secured to the forward edge of the other side wall 7 extends forwardly from the other outer edge of frame 6. A spacer bar 31 is secured in the corner between flange 29 and the forward outer edge of side wall 7. A similar spacer bar 32 is secured in the corner between flange 30 and side wall 7. Spacer bars 31 and 32 are each approximately the same height as flanges 29 and 30.

The comminuting device comprises a cutting cylinder 33, rake 34 and comb 35. The cutting cylinder is provided with a shaft 36 rotatably mounted in the sides 37 and 38 of a frame 39, hereinafter described. Mounted on shaft 36 is a plurality of transversely spaced disks 40, each of which has a plurality of teeth 41 projecting from its periphery. Disks 40 are held apart by suitable spacers 42, and a plurality of shear bars 43 is secured to each spacer. The cylinder is so arranged that when it is in its rearmost position, teeth 41 will be spaced a short distance from the screen and will not project into the spaces between adjacent screen ribbons 12.

Rake 34 is provided with end plates 44 by means of which it is secured to frame members 37 and 38. Comb 35 is mounted on the lower end portion of rake 34 which is inclined away from screen ribbons 12. Notches 45 provided in the lower edge of comb 35 are aligned with disks 40 to permit teeth 41 to pass therebetween while cylinder 33 is being rotated. Shear bars 43 cooperate with the portions of the lower edge of comb 35 between adjacent notches 45 to facilitate the comminution of solids that are long enough to extend across two adjacent disks.

The comminuting device is carried in frame 39 comprising side frame members 37 and 38 and a transverse top member 46. Frame 39 is juxtaposed against the upstream surface of frame 6 and is slidable vertically relative thereto. A crank 47 secured at one end to a bracket 48 carried by top member 46 is secured at its other end to a stud 49 projecting laterally from chain 26. As the rotation of sprocket 24 moves chain 26 vertically, frame 39 is also moved vertically. The connection between crank 47 and bracket 48 is pivotal to permit transverse movement of the upper end of the crank in response to the transverse movement of stud 49 at the upper and lower limits of its travel.

Top member 46 of frame 39 has a pair of ears 50 projecting upwardly therefrom. A bracket 51 having a vertical portion fitting T-bar 19 has its lower portion pivotally mounted on a bolt 52 extending transversely through ears 50. The interengagement of bracket 51 and T-bar 19 permits the bracket, and frame 39 to which it is secured, to move vertically relative to frame 6, and the pivotal structure of the bracket permits frame 39 to move pivotally relative to frame 6. Bracket 48 is also pivoted to permit it to swing with frame 39 so that crank 47 will not become bent if frame 39 is swung away from frame 6. Spacer bars 31 and 32 prevent frame 39 from moving inwardly too close to screen 11. Side member 37 has a recessed block 53 adapted to engage spacer bar 31, and side member 38 has a similar block 54 adapted to engage spacer bar 32. The weight of the comminuting device normally holds blocks 53 and 54 in engagement with bars 31 and 32 respectively. In this position the cutting cylinder is spaced from the screen a predetermined distance that permits teeth 41 to pass slightly forward of screen elements 12.

Side frame member 38 serves as a housing for a lower sprocket 54 mounted on shaft 36, an upper sprocket 55, and an endless chain 56 extending around both sprockets. Sprocket 55 is driven by a motor 57 to rotate cutting cylinder 33. Cylinder 33 is constantly rotated in the same direction with the teeth on the lower portion of its circumference moving away from screen 11. Motor 57 is mounted on housing 38 so that it travels vertically with frame 39. This arrangement permits a fixed relationship between motor 57 and the cutting cylinder driven by it, and thus permits better control of the cutting cylinder. Although motor 57 is submersible and will operate under water, it is preferred to mount it above transverse member 46 so that when frame 39 is in its lowermost position the motor is above the top of the screen and is therefore out of the sewage stream.

The vertical flanges 29 and 30 serve as lateral guides during the vertical movement of frame 39 relative to frame 6. However, the extra weight on the side of frame 39 on which motor 57 is mounted might cause the frame to bind, and thus interfere with its vertical movement. The center guide 19 is provided to counteract the tendency of frame 39 to bind, and the sliding engagement of bracket 51 with the T-shaped guide 19 prevents any binding.

Rake 34 is an angular bar substantially triangular in cross section and has one side positioned adjacent the upstream surface of screen ribbons 12. The upper edge of rake 34 slopes downwardly and outwardly from the screen. As the liquid sewage flows through the screen, solids that are too large to pass between the screen ribbons are intercepted and held against the upstream surface of the screen by the force of the flowing sewage. As rake 34 is moved upwardly its upper edge sweeps the upstream surface of the screen and removes the intercepted solids from the screen. As the solids are removed from the screen the angular shape of the rake causes some of the solids to fall into contact with cylinder 33. Comb 35 is spaced so close to the surface area of cylinder 33 on which such solids fall that they are comminuted immediately. It is not necessary for the cylinder to carry the solids around a substantial portion of its circumference. The rest of the solids are held against the sloping surface of rake 34 or against the screen above the rake until the upper edge of the rake moves on to shield 14. Shield 14 is above the liquid level of the sewage and the solids are released from the force exerted by the flowing sewage when the rake pushes them on to the shield. As the solids reach shield 14 they fall downwardly on cylinder 33, and are comminuted by the interaction of teeth 41 and notches 45 of comb 35.

The lower end of rake 34 is provided with an inner edge 58 which slopes upwardly and outwardly from the screen. Edge 58 is closer to the surface of the screen than teeth 41 are, and solids that are too small to be moved away from the screen by the teeth are pushed downwardly by edge 58 of the rake. In the lowermost position of rake 34 its lower edge 58 engages shield 17, and the solids pushed downwardly by the rake are moved back into the sewage stream by the teeth 41. The curvature of shield 17 facilitates the action of the cylinder in moving the solids back into the sewage stream. However, if a solid too large to be moved back into the sewage stream is encountered by cylinder 33 during the downward movement of the cylinder, the pivotal joint between frame 39 and bracket 51 permits the lower portion of frame 39 to swing outwardly and ride over the solid. The engagement of bracket 51 and T-bar 19 prevents displacement of the upper portion of frame 39 relative to frame 6 when its lower portion swings outwardly. After the cylinder passes over the oversized solid on the upwardly movement the weight of frame 39 causes it to return to its normal position in which it is juxtaposed against the upstream surface of frame 6. Every time cylinder 33 rides over an oversized solid the teeth bite out small portions of the solid so that eventually it is comminuted.

While I have described a preferred embodiment of my invention in considerable detail, it will be understood that the description thereof is intended to be illustrative, rather than restrictive, as many details may be modified or changed without departing from the spirit or scope of the invention. Accordingly, I do not desire to be restricted to the exact construction described.

I claim:

1. A comminuting device comprising a frame, a screen mounted in said frame, a second frame movably mounted adjacent said first mentioned frame, a rake, a cutting cylinder, and a comb mounted in said second frame, means for moving said second frame vertically in a plane parallel to the plane of said first mentioned frame, said rake being juxtaposed against the upstream surface of said screen and being shaped to wipe solids intercepted by said screen from said screen surface as said rake is moved upwardly or downwardly, said cylinder being positioned out of engagement with said screen and below said rake in position to catch solids falling from said rake as it is being moved upwardly, and means for rotating said cylinder to carry solids on the periphery of said cylinder to said comb, said cylinder being adapted to cooperate with said comb to comminute solids carried by said cylinder to said comb.

2. A comminuting device comprising a vertically disposed frame, a screen mounted in said frame, said screen comprising a plurality of vertical screen elements spaced transversely of said frame, a vertical guide member extending between the upper edge of said screen and the top of said frame, a second frame juxtaposed against the upstream surface of said first mentioned frame, a rake mounted in said second frame, said second frame having an upper edge pivotally secured to said guide member, a cutting cylinder rotatably mounted in said second frame out of engagement with said screen and below said rake, said rake having an upper edge juxtaposed against the upstream surface of said screen elements, a comb mounted on the free edge of said rake adjacent said cutting cylinder, means for rotating said cylinder to move solids engaged thereby to said comb and to comminute them in cooperation with said comb, and means for moving said second frame vertically in a plane parallel to the plane of said first mentioned frame to cause said rake and cutting cylinder to periodically sweep the upstream surface of said screen.

3. A comminuting device comprising a vertically disposed frame, a screen mounted in said frame, said screen comprising a plurality of vertical screen elements spaced transversely of said frame, a second frame juxtaposed against the upstream surface of said first mentioned frame, means for moving said second frame vertically in a plane parallel to the plane of said first frame, a rake, cutting cylinder, and comb mounted in said second frame, said rake having an upper and a lower edge positioned adjacent the upstream surface of said screen elements, said upper edge being adapted to move solids intercepted by said screen elements upwardly and forwardly from said screen elements upon upward movement of said second frame, said lower edge being adapted to move solids intercepted by said screen elements downwardly and forwardly from said screen elements upon downward movement of said second frame, said cutting cylinder being positioned out of engagement with said screen and below said rake in position to engage solids removed from said screen elements upon upward movement of said rake, said comb having one edge positioned adjacent said cutting cylinder, and means for rotating said cutting cylinder to carry solids engaged by said cylinder to said comb, said cylinder and comb being adapted to cooperate to comminute said solids.

4. A comminuting device comprising a vertically disposed frame, a screen mounted in said frame, said screen comprising a plurality of vertical screen elements spaced transversely of said frame, a second frame juxtaposed against the upstream surface of said first mentioned frame, means for moving said second frame vertically in a plane parallel to the plane of said first frame, a rake mounted in said second frame with its upper edge juxtaposed against the upstream surface of said screen elements, said upper edge sloping downwardly and forwardly from said screen elements to wipe solids from said screen upon upward movement of said second frame, a comb secured to the lower outer edge of said rake, a cutting cylinder rotatably mounted in said second frame in juxtaposition to said comb and out of engagement with said screen, and means for rotating said cutting cylinder, said cylinder being adapted to engage solids wiped from said rake and to carry them to said comb for comminution by interaction between said cylinder and said comb.

5. A comminuting device comprising a stationary screen, a guide member projecting upwardly from said screen, a frame having a transverse top member pivotally secured to said guide member, means for reciprocating said frame vertically in a plane parallel to the plane of said screen, a rake mounted in said frame, said rake being adapted to remove solids from said screen, a cutting cylinder rotatably mounted in said frame below said rake, said cutting cylinder being out of engagement with said screen, a comb mounted in said frame in predetermined relationship to said cylinder, and means for rotating said cylinder to engage solids removed from said screen by said rake and to comminute them in cooperation with said comb.

6. A comminuting device comprising a stationary screen, a guide member projecting upwardly from said screen, a frame having a transverse top member pivotally secured to said guide member, means for reciprocating said frame vertically in a plane parallel to the plane of said screen, a rake mounted in said frame, said rake being adapted to remove solids from said screen, a comb mounted on said rake, said comb having a plurality of laterally spaced notches on one edge thereof, a cylinder rotatably mounted in said frame in predetermined spaced relationship to the notched edge of said comb, means for rotating said cylinder, and a plurality of disks on said cylinder, each of said disks being aligned with one of said notches and provided with teeth, said teeth being out of engagement with said screen, said teeth being adapted to engage solids removed from said screen by said rake and to pass through said notches to comminute said solids as said cylinder is rotated.

7. A comminuting device comprising a stationary screen, a guide member projecting upwardly from said screen, a frame having a transverse top member pivotally secured to said guide member, means for reciprocating said frame vertically in a plane parallel to the plane of said screen, a rake mounted in said frame, said rake being adapted to remove solids from said screen upon vertical movement of said frame, a comb mounted on said rake, said comb having a plurality of laterally spaced notches on one edge thereof, a cylinder rotatably mounted in said frame in predetermined spaced relationship to the notched edge of said comb, means for rotating said cylinder, a plurality of disks on said cylinder, each of said disks being aligned with one of said notches and provided with teeth, said teeth being out of engagement with said screen, said teeth being adapted to engage solids removed from said screen by said rake and to pass through said notches to comminute said solids as said cylinder is rotated, and a plurality of shear bars mounted on said cylinder between said disks, said shear bars being adapted to cooperate with said comb edge between said notches to prevent excessive accumulation of solids on said cylinder between said disks.

References Cited in the file of this patent

UNITED STATES PATENTS 2,672,985    Nordell _____ Mar. 23, 1954